US012378887B2

(12) United States Patent
Ramakrishnan et al.

(10) Patent No.: US 12,378,887 B2
(45) Date of Patent: Aug. 5, 2025

(54) AIRFOIL ASSEMBLY

(71) Applicant: General Electric Company, Schenectady, NY (US)

(72) Inventors: Kishore Ramakrishnan, Rexford, NY (US); Valeria Andreoli, Watertown, MA (US); Trevor Howard Wood, Clifton Park, NY (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 17/994,549

(22) Filed: Nov. 28, 2022

(65) Prior Publication Data

US 2024/0175362 A1 May 30, 2024

(51) Int. Cl.
*F01D 5/14* (2006.01)

(52) U.S. Cl.
CPC ........ *F01D 5/142* (2013.01); *F05D 2240/301* (2013.01); *F05D 2240/303* (2013.01); *F05D 2240/304* (2013.01); *F05D 2250/70* (2013.01); *F05D 2260/961* (2013.01)

(58) Field of Classification Search
CPC .......... F01D 5/142; F01D 5/141; F01D 5/145; F01D 9/041; F05D 2240/301; F05D 2250/70; F05D 2260/961; F05D 2240/303; F05D 2240/304; F04D 29/325
See application file for complete search history.

(56) References Cited

U.S. PATENT DOCUMENTS

| | | | | |
|---|---|---|---|---|
| 6,341,942 | B1 * | 1/2002 | Chou | F01D 5/141 416/228 |
| 6,358,003 | B2 | 3/2002 | Schlechtriem | |
| 6,733,240 | B2 * | 5/2004 | Gliebe | F04D 29/324 416/228 |
| 8,944,774 | B2 | 2/2015 | Bielek | |
| 9,249,666 | B2 | 2/2016 | Wood et al. | |
| 9,630,704 | B2 | 4/2017 | Vion et al. | |
| 10,113,431 | B2 | 10/2018 | Namgoong | |
| 10,358,938 | B2 | 7/2019 | Romano et al. | |
| 10,370,086 | B2 * | 8/2019 | Vion | F01D 5/145 |
| 10,465,520 | B2 | 11/2019 | Vandeputte | |
| 11,203,935 | B2 | 12/2021 | Hiernaux | |
| 2009/0013532 | A1 * | 1/2009 | Wood | F04D 29/324 29/889.7 |
| 2014/0017086 | A1 * | 1/2014 | Charier | F04D 29/185 416/128 |

* cited by examiner

*Primary Examiner* — Courtney D Heinle
*Assistant Examiner* — Andrew Thanh Bui
(74) *Attorney, Agent, or Firm* — Dority & Manning, P.A.

(57) ABSTRACT

An airfoil assembly for a gas turbine engine includes a first blade having a first leading edge and a first trailing edge, and a second blade circumferentially spaced from the first blade where the second blade has a second leading edge and a second trailing edge. The first blade includes a feature formed on the first leading edge where the first blade includes a chord extending from the first leading edge to the first trailing edge. The chord is located radially where a projection of a line normal to an intersection of the chord with the first trailing edge intersects the second leading edge. At least a portion of the feature is radially located at or inboard of the chord.

20 Claims, 10 Drawing Sheets

AIRFOIL ASSEMBLY

FIELD

The present subject matter relates generally to components of a gas turbine engine, or more particularly to an airfoil assembly.

BACKGROUND

A gas turbine engine generally includes a fan and a turbomachine arranged in flow communication with one another. Additionally, the turbomachine of the gas turbine engine generally includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gases through the turbine section drives the turbine section and is then routed through the exhaust section, e.g., to atmosphere.

The fan is driven by the turbomachine. The fan includes a plurality of circumferentially spaced fan blades extending radially outward from a rotor disk. Rotation of the fan blades creates an airflow through the inlet to the compressor section of the turbomachine, as well as an airflow over the turbomachine.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

Figure 1:
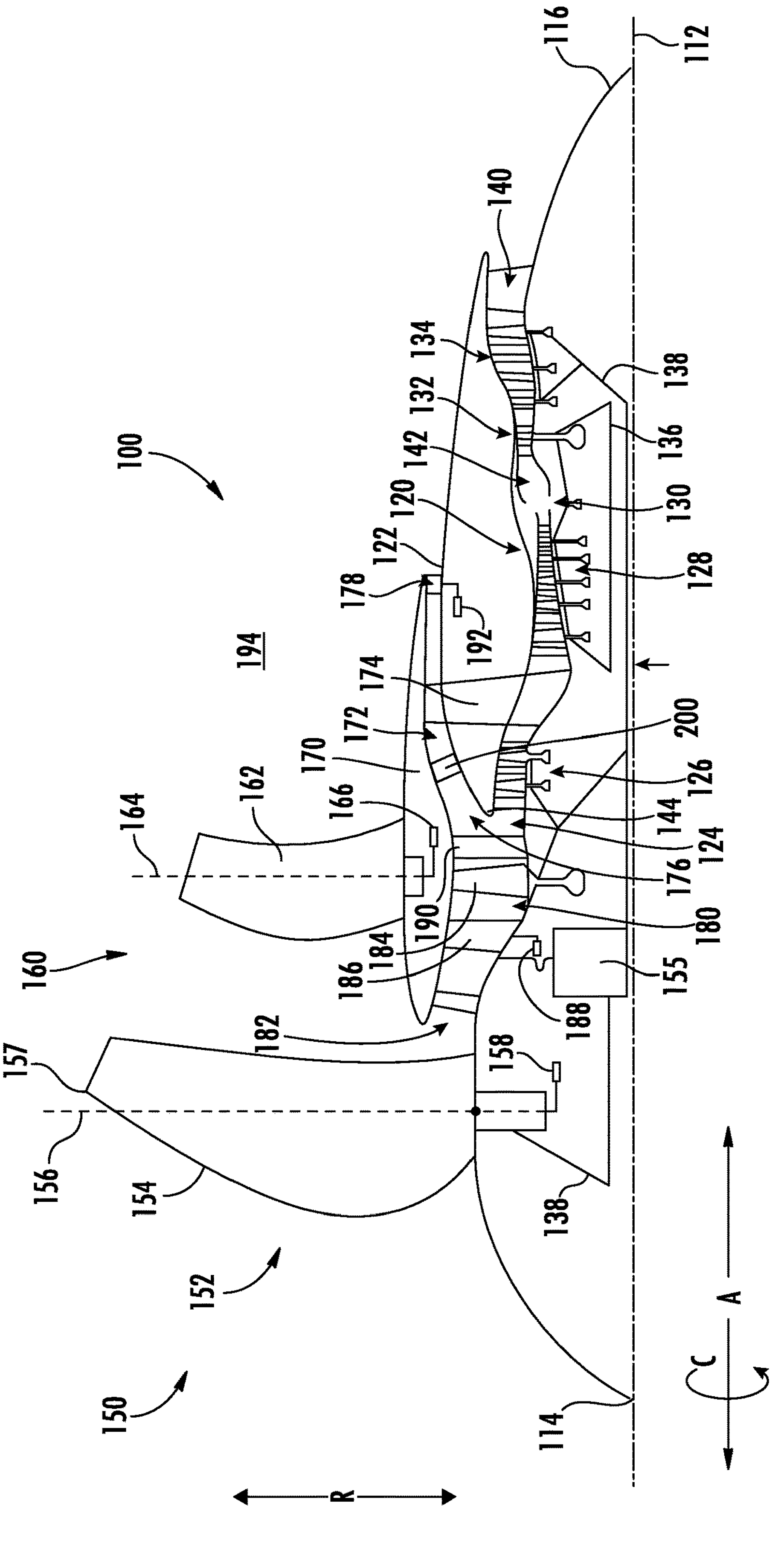
FIG. 1 is a schematic, cross-sectional view of an exemplary, unducted gas turbine engine according to various embodiments of the present subject disclosure.

Repeat use of reference characters in the present specification and drawings is intended to represent the same or analogous features or elements of the present subject matter.

DETAILED DESCRIPTION

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first", "second", and "third" may be used interchangeably to distinguish one component from another and are not intended to signify location or importance of the individual components.

The terms "forward" and "aft" refer to relative positions within a turbomachine, gas turbine engine, or vehicle and refer to the normal operational attitude of the same. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled", "fixed", "attached to", and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

The term "at least one of" in the context of, e.g., "at least one of A, B, and C" refers to only A, only B, only C, or any combination of A, B, and C.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The term "turbomachine" or "turbomachinery" refers to a machine including one or more compressors, a heat generating section (e.g., a combustion section), and one or more turbines that together generate a torque output.

The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

In certain aspects of the present disclosure, an airfoil assembly for a turbomachine is provided. The airfoil assembly generally includes circumferentially spaced airfoils or blades where the blades include a leading edge shape variation feature to reduce the noise effects resulting from pressure waves generated by the blades. For example, embodiments of the present disclosure reduce the pressure signature generated by the rotating blades by blocking or disrupting the pressure waves emanating from the blades by changing the axial sweep profile of the leading edge of the blade.

Referring now to FIG. 1, a schematic cross-sectional view of a gas turbine engine 100 is provided according to an example embodiment of the present disclosure. Particularly, FIG. 1 provides a turbofan engine having a rotor assembly with a single stage of unducted rotor blades. In such a manner, the rotor assembly may be referred to herein as an "unducted fan," or the entire gas turbine engine 100 may be referred to as an "unducted turbofan engine." In addition, the gas turbine engine 100 of FIG. 1 includes a third stream extending from the compressor section to a rotor assembly flowpath over the turbomachine, as will be explained in more detail below.

For reference, the gas turbine engine 100 defines an axial direction A, a radial direction R, and a circumferential direction C. Moreover, the gas turbine engine 100 defines an axial centerline or longitudinal axis 112 that extends along the axial direction A. In general, the axial direction A extends parallel to the longitudinal axis 112, the radial direction R extends outward from and inward to the longitudinal axis 112 in a direction orthogonal to the axial direction A, and the circumferential direction extends three hundred sixty degrees (360°) around the longitudinal axis 112. The gas turbine engine 100 extends between a forward end 114 and an aft end 116, e.g., along the axial direction A.

The gas turbine engine 100 includes a turbomachine 120 and a rotor assembly, also referred to as a fan section 150, positioned upstream thereof. Generally, the turbomachine 120 includes, in serial flow order, a compressor section, a combustion section, a turbine section, and an exhaust section. Particularly, as shown in FIG. 1, the turbomachine 120 includes a core cowl 122 that defines an annular core inlet 124. The core cowl 122 further encloses at least in part a low pressure system and a high pressure system. For example, the core cowl 122 depicted encloses and supports at least in part a booster or low pressure ("LP") compressor 126 for pressurizing the air that enters the turbomachine 120 through core inlet 124. A high pressure ("HP"), multi-stage, axial-flow compressor 128 receives pressurized air from the LP compressor 126 and further increases the pressure of the air. The pressurized air stream flows downstream to a combustor 130 of the combustion section where fuel is injected into the pressurized air stream and ignited to raise the temperature and energy level of the pressurized air.

It will be appreciated that as used herein, the terms "high/low speed" and "high/low pressure" are used with respect to the high pressure/high speed system and low pressure/low speed system interchangeably. Further, it will be appreciated that the terms "high" and "low" are used in this same context to distinguish the two systems, and are not meant to imply any absolute speed and/or pressure values.

The high energy combustion products flow from the combustor 130 downstream to a high pressure turbine 132. The high pressure turbine 132 drives the high pressure compressor 128 through a high pressure shaft 136. In this regard, the high pressure turbine 132 is drivingly coupled with the high pressure compressor 128. The high energy combustion products then flow to a low pressure turbine 134. The low pressure turbine 134 drives the low pressure compressor 126 and components of the fan section 150 through a low pressure shaft 138. In this regard, the low pressure turbine 134 is drivingly coupled with the low pressure compressor 126 and components of the fan section 150. The LP shaft 138 is coaxial with the HP shaft 136 in this example embodiment. After driving each of the turbines 132, 134, the combustion products exit the turbomachine 120 through a turbomachine exhaust nozzle 140.

Accordingly, the turbomachine 120 defines a working gas flowpath or core duct 142 that extends between the core inlet 124 and the turbomachine exhaust nozzle 140. The core duct 142 is an annular duct positioned generally inward of the core cowl 122 along the radial direction R. The core duct 142 (e.g., the working gas flowpath through the turbomachine 120) may be referred to as a second stream.

The fan section 150 includes a fan 152, which is the primary fan in this example embodiment. For the depicted embodiment of FIG. 1, the fan 152 is an open rotor or unducted fan 152. In such a manner, the gas turbine engine 100 may be referred to as an open rotor engine.

As depicted, the fan 152 includes an array of airfoils arranged around the longitudinal axis 112 of engine 100, and more particularly includes an array of fan blades 154 (only one shown in FIG. 1) arranged around the longitudinal axis 112 of engine 100. The fan blades 154 are rotatable, e.g., about the longitudinal axis 112. As noted above, the fan 152 is drivingly coupled with the low pressure turbine 134 via the LP shaft 138. For the embodiments shown in FIG. 1, the fan 152 is coupled with the LP shaft 138 via a speed reduction gearbox 155, e.g., in an indirect-drive or geared-drive configuration.

Moreover, the array of fan blades 154 can be arranged in equal spacing around the longitudinal axis 112. Each fan blade 154 has a proximal end or root and a distal end or tip and a span defined therebetween. For descriptive purposes, reference will be made to a "tip radius", represented as "$R_{tip}$", of the fan blade 154. The tip radius $R_{tip}$ is the radial distance from the longitudinal axis 112 to the outermost radial coordinate or a tip 157 of the fan blade 154, typically at the leading edge of the fan blade 154. A point located at the tip 157 would be referred to as 100% of tip radius $R_{tip}$, and a point at the longitudinal axis 112 would be referred to as 0% of tip radius $R_{tip}$. Each fan blade 154 defines a pitch change or central blade axis 156. For this embodiment, each fan blade 154 of the fan 152 is rotatable about its central blade axis 156, e.g., in unison with one another. One or more actuators 158 are provided to facilitate such rotation and therefore may be used to change a pitch of the fan blades 154 about their respective central blade axes 156.

The fan section 150 further includes an array of airfoils positioned aft of the fan blades 154 and also disposed around longitudinal axis 112, and more particularly includes a fan guide vane array 160 that includes fan guide vanes 162 (only one shown in FIG. 1) disposed around the longitudinal axis 112. For this embodiment, the fan guide vanes 162 are not rotatable about the longitudinal axis 112. Each fan guide vane 162 has a proximal end or root and a distal end or tip and a span defined therebetween. The fan guide vanes 162 may be unshrouded as shown in FIG. 1 or, alternatively, may be shrouded, e.g., by an annular shroud spaced outward from the tips of the fan guide vanes 162 along the radial direction R or attached to the fan guide vanes 162.

Each fan guide vane 162 defines a central blade axis 164. For this embodiment, each fan guide vane 162 of the fan guide vane array 160 is rotatable about its respective central blade axis 164, e.g., in unison with one another. One or more actuators 166 are provided to facilitate such rotation and therefore may be used to change a pitch of the fan guide vane 162 about its respective central blade axis 164. However, in other embodiments, each fan guide vane 162 may be fixed or unable to be pitched about its central blade axis 164. The fan guide vanes 162 are mounted to a fan cowl 170.

As shown in FIG. 1, in addition to the fan 152, which is unducted, a ducted fan 184 is included aft of the fan 152, such that the gas turbine engine 100 includes both a ducted and an unducted fan which both serve to generate thrust through the movement of air without passage through at least a portion of the turbomachine 120 (e.g., without passage through the HP compressor 128 and combustion section for the embodiment depicted). The ducted fan 184 is rotatable about the same axis (e.g., the longitudinal axis 112) as the fan blade 154. The ducted fan 184 is, for the embodiment depicted, driven by the low pressure turbine 134 (e.g. coupled to the LP shaft 138). In the embodiment depicted, as noted above, the fan 152 may be referred to as the primary fan, and the ducted fan 184 may be referred to as a secondary fan. It will be appreciated that these terms "primary" and "secondary" are terms of convenience, and do not imply any particular importance, power, or the like.

The ducted fan 184 includes a plurality of fan blades (not separately labeled in FIG. 1) arranged in a single stage, such that the ducted fan 184 may be referred to as a single stage fan. The fan blades of the ducted fan 184 can be arranged in equal spacing around the longitudinal axis 112. Each blade of the ducted fan 184 has a proximal end or root and a distal end or tip and a span defined therebetween.

The fan cowl 170 annularly encases at least a portion of the core cowl 122 and is generally positioned outward of at least a portion of the core cowl 122 along the radial direction R. Particularly, a downstream section of the fan cowl 170 extends over a forward portion of the core cowl 122 to define a fan duct flowpath, or simply a fan duct 172. According to this embodiment, the fan flowpath or fan duct 172 may be understood as forming at least a portion of the third stream of the engine 100.

Incoming air may enter through the fan duct 172 through a fan duct inlet 176 and may exit through a fan exhaust nozzle 178 to produce propulsive thrust. The fan duct 172 is an annular duct positioned generally outward of the core duct 142 along the radial direction R. The fan cowl 170 and the core cowl 122 are connected together and supported by a plurality of substantially radially-extending, circumferentially-spaced stationary struts 174 (only one shown in FIG. 1). The stationary struts 174 may each be aerodynamically contoured to direct air flowing thereby. Other struts in addition to the stationary struts 174 may be used to connect and support the fan cowl 170 and/or core cowl 122. In many embodiments, the fan duct 172 and the core duct 142 may at least partially co-extend (generally axially) on opposite sides (e.g., opposite radial sides) of the core cowl 122. For example, the fan duct 172 and the core duct 142 may each extend directly from a leading edge 144 of the core cowl 122 and may partially co-extend generally axially on opposite radial sides of the core cowl 122.

The gas turbine engine 100 also defines or includes an inlet duct 180. The inlet duct 180 extends between the engine inlet 182 and the core inlet 124/fan duct inlet 176. The engine inlet 182 is defined generally at the forward end of the fan cowl 170 and is positioned between the fan 152 and the fan guide vane array 160 along the axial direction A. The inlet duct 180 is an annular duct that is positioned inward of the fan cowl 170 along the radial direction R. Air flowing downstream along the inlet duct 180 is split, not necessarily evenly, into the core duct 142 and the fan duct 172 by a fan duct splitter or leading edge 144 of the core cowl 122. In the embodiment depicted, the inlet duct 180 is wider than the core duct 142 along the radial direction R. The inlet duct 180 is also wider than the fan duct 172 along the radial direction R.

Notably, for the embodiment depicted, the engine 100 includes one or more features to increase an efficiency of a third stream thrust, Fn3S (e.g., a thrust generated by an airflow through the fan duct 172 exiting through the fan exhaust nozzle 178, generated at least in part by the ducted fan 184). In particular, the engine 100 further includes an array of inlet guide vanes 186 positioned in the inlet duct 180 upstream of the ducted fan 184 and downstream of the engine inlet 182. The array of inlet guide vanes 186 are arranged around the longitudinal axis 112. For this embodiment, the inlet guide vanes 186 are not rotatable about the longitudinal axis 112. Each inlet guide vanes 186 defines a central blade axis (not labeled for clarity), and is rotatable about its respective central blade axis, e.g., in unison with one another. In such a manner, the inlet guide vanes 186 may be considered a variable geometry component. One or more actuators 188 are provided to facilitate such rotation and therefore may be used to change a pitch of the inlet guide vanes 186 about their respective central blade axes. However, in other embodiments, each inlet guide vanes 186 may be fixed or unable to be pitched about its central blade axis.

Further, located downstream of the ducted fan 184 and upstream of the fan duct inlet 176, the gas turbine engine 100 includes an array of outlet guide vanes 190. As with the array of inlet guide vanes 186, the array of outlet guide vanes 190 are not rotatable about the longitudinal axis 112. However, for the embodiment depicted, unlike the array of inlet guide vanes 186, the array of outlet guide vanes 190 are configured as fixed-pitch outlet guide vanes.

Further, it will be appreciated that for the embodiment depicted, the fan exhaust nozzle 178 of the fan duct 172 is further configured as a variable geometry exhaust nozzle. In such a manner, the engine 100 includes one or more actuators 192 for modulating the variable geometry exhaust nozzle. For example, the variable geometry exhaust nozzle may be configured to vary a total cross-sectional area (e.g., an area of the nozzle in a plane perpendicular to the longitudinal axis 112) to modulate an amount of thrust generated based on one or more engine operating conditions (e.g., temperature, pressure, mass flowrate, etc. of an airflow through the fan duct 172). A fixed geometry exhaust nozzle may also be adopted.

Moreover, referring still to FIG. 1, in exemplary embodiments, air passing through the fan duct 172 may be relatively cooler (e.g., lower temperature) than one or more fluids utilized in the turbomachine 120. In this way, one or more heat exchangers 200 may be positioned in thermal communication with the fan duct 172. For example, one or more heat exchangers 200 may be disposed within the fan duct 172 and utilized to cool one or more fluids from the core engine with the air passing through the fan duct 172, as a resource for removing heat from a fluid, e.g., compressor bleed air, oil or fuel.

Figure 2:
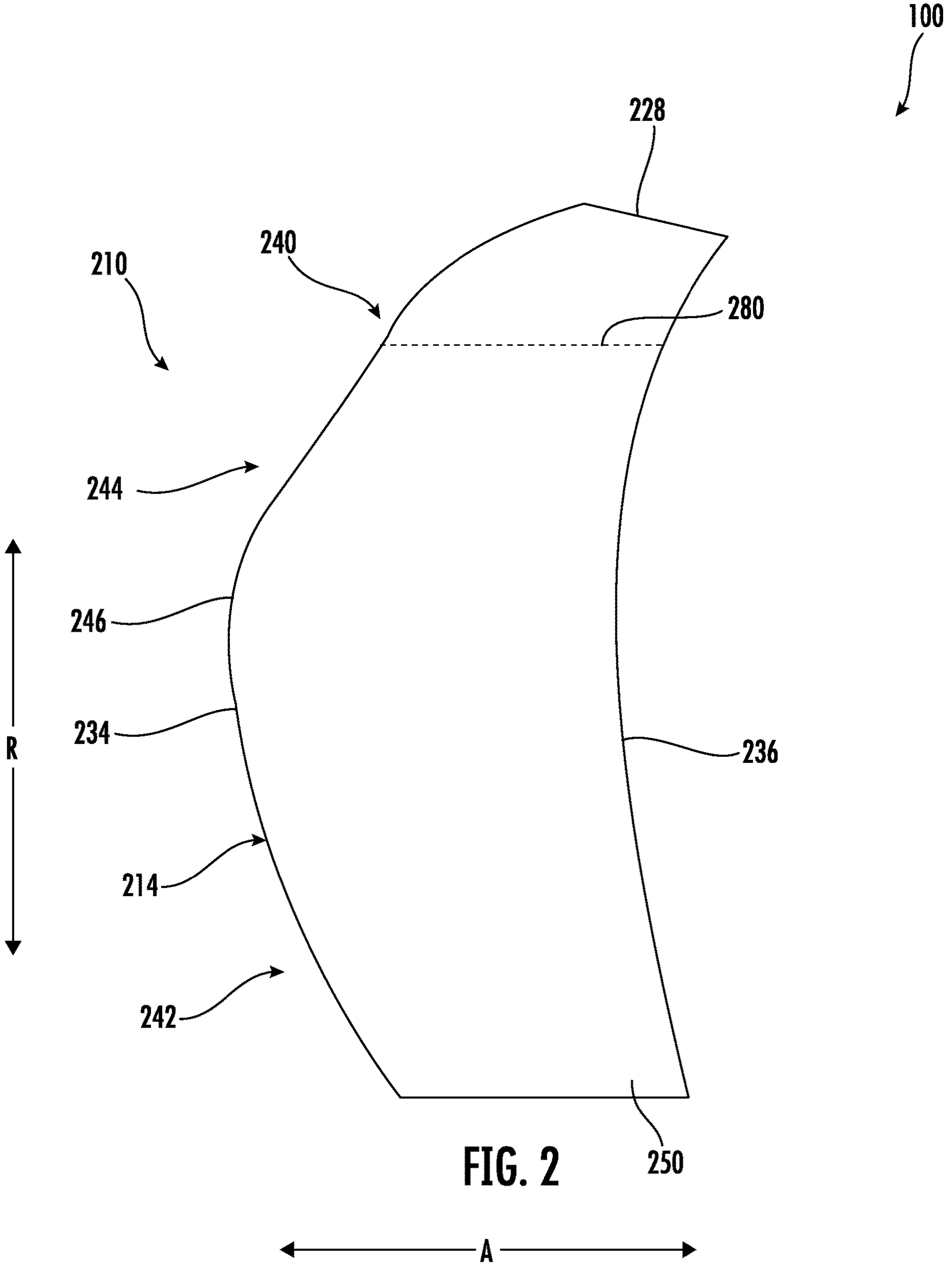
FIG. 2 is a schematic view of an exemplary airfoil according to various embodiments of the present disclosure.

Referring now to FIG. 2, a schematic and fragmentary view of an exemplary airfoil assembly 210 in accordance with various embodiments of the present disclosure is provided. The exemplary airfoil assembly 210 may be configured for use as the fan 152 of the engine 100 as depicted in FIG. 1. The airfoil assembly 210 includes an array of airfoils or blades 214 (only one shown in FIG. 2) that are regularly spaced apart circumferentially around a disk or hub of a rotor centered on the longitudinal axis 112 (FIG. 1) of the fan 152 (FIG. 1). Each blade 214 includes a proximal end 250 (i.e., an inboard end in the radial direction R toward the longitudinal axis 112 (FIG. 1)) and a distal end or tip 228 such that a span of the blade 214 is defined between the proximal end 250 and the tip 228. Blade 214 forms an aerodynamic surface extending along the axial direction A between a leading edge 234 and a trailing edge 236. The blade 214 extends outward from the proximal end 250 in the radial direction R. In the illustrated embodiment, the leading edge 234 includes an inboard portion 242 that extends outward in the radial direction R to a particular span location and an outboard portion 244 that extends from the inboard portion 242 to the tip 228. In the illustrated embodiment, the leading edge 234 of the inboard portion 242 sweeps forward in the axial direction A, and the leading edge 234 of the outboard portion 244 begins sweeping aft in the axial direction A outboard of the inboard portion 242. As will be described in greater detail below, blade 214 includes a feature 240 on the leading edge 234 that disrupts a pressure wave radiated from an adjacent blade 214 to achieve noise reduction (e.g., at cruise condition/operation). In exemplary embodiments of the present disclosure, the feature 240 is a shape variation on or along the leading edge 234 of the blade 214 on the outboard portion 244 of the blade 214 that changes the axial sweep profile of the leading edge 234 of the blade 214. For example, as will be described in further detail below, in exemplary embodiments of the present disclosure, the feature 240 provides a decrease in sweep of the leading edge 234 of the blade 214 beginning at a particular radial or span location of the blade 214 and extending to the tip 228 of the blade 214 to provide a single region of negative sweep gradient of the leading edge 234. For example, in the illustrated embodiment, the leading edge 234 of the blade 214 transitions from sweeping forward (e.g., the inboard portion 242) to sweeping aft (the outboard portion 244) at a particular span location 246 (e.g., a span location corresponding to a forward-most axial location of the leading edge 234). As the leading edge 234 begins sweeping aft outboard of the span location 246 toward the tip 238, the feature 240 causes a change or deviation to the axial sweep profile such that the feature 240 causes a reduction in the sweep angle or profile along at least a portion of the leading edge 234. Thus, in exemplary embodiments of the present disclosure, the feature 240 is located in an acoustically active span of the blade 214. An acoustically active portion or span of the blade 214 may be determined, for example, via a relationship between a source strength distributed radially along the blade 214 and a radiation efficiency along the blade 214. The acoustically active portion of the blade 214 may be determined by multiplying an acoustic source strength distributed radially along the blade 214 by an acoustic Green's function or radiation efficiency (e.g., the ability of noise sources to propagate acoustic energy to surrounding media) along the blade 214. The radiation efficiency may be any known relation describing the effective strength of a noise source on the airfoil, fan or propeller blade to an observer location of interest, and may be dependent on the airfoil shape, size, flow conditions, combinations thereof, or the like. In some exemplary embodiments, the trailing edge 236 of the blade 214 is configured having a smooth, curved profile (e.g., without steps or abrupt axial sweep changes/transitions).

Referring now to FIG. 3A-8C, FIGS. 3A, 4A, 5A, 6A, 7A, and 8A depict schematic views of exemplary airfoils or blades 214 according to various embodiments of the present disclosure. FIGS. 3B, 4B, 5B, 6B, 7B, and 8B depict graphs plotting an axial sweep profile of the leading edge 234 of the airfoils or blades 214 depicted in respective FIGS. 3A, 4A, 5A, 6A, 7A, and 8A where the axial sweep profile depicts a change in axial coordinates Z of the leading edge 234 relative to or as a function of a change in radial coordinates R or span of the leading edge 234. FIGS. 3C, 4C, 5C, 6C, 7C, and 8C depict graphs plotting a derivative of the axial sweep profile depicted in respective FIGS. 3B, 4B, 5B, 6B, 7B, and 8B.

Figure 3C:
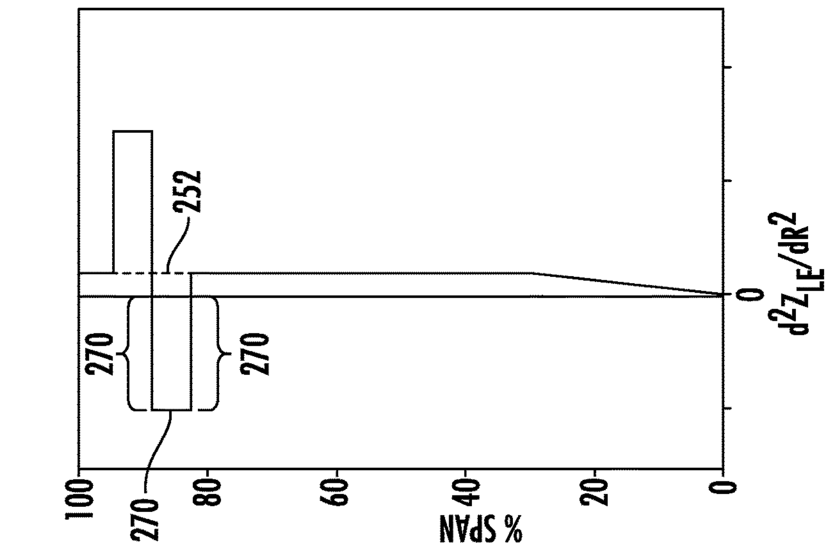
FIG. 3C is a graph plotting a derivative of the axial sweep profile depicted in FIG. 3B according to an embodiment of the present disclosure.
Figure 3B:
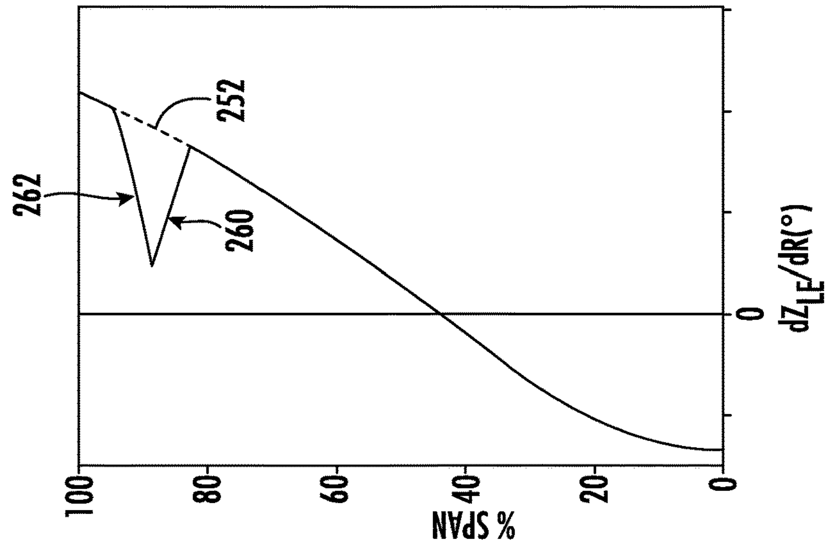
FIG. 3B is a graph plotting an axial sweep profile of the airfoil of FIG. 3A according to an embodiment of the present disclosure.
Figure 3A:
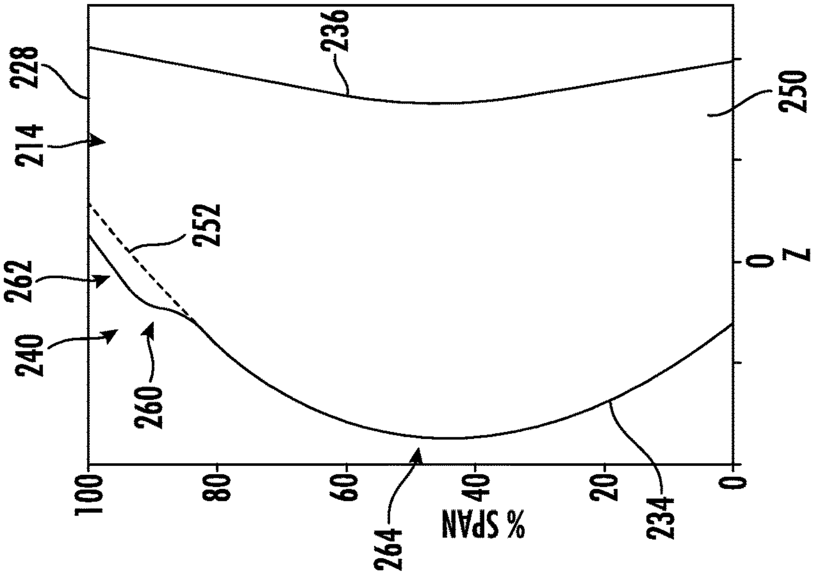
FIG. 3A is a schematic view of an exemplary airfoil according to an embodiment of the present disclosure.
Figure 4A:
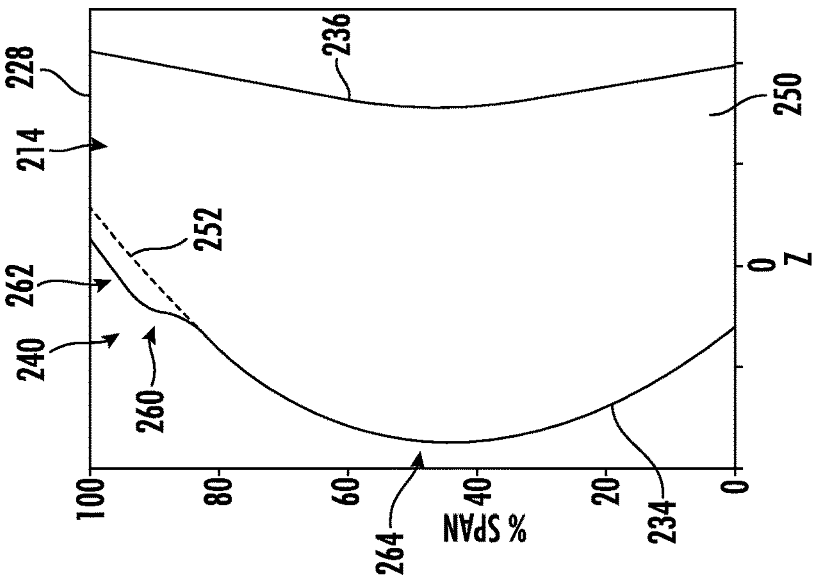
FIG. 4A is a schematic view of an exemplary airfoil according to another embodiment of the present disclosure.
Figure 4B:
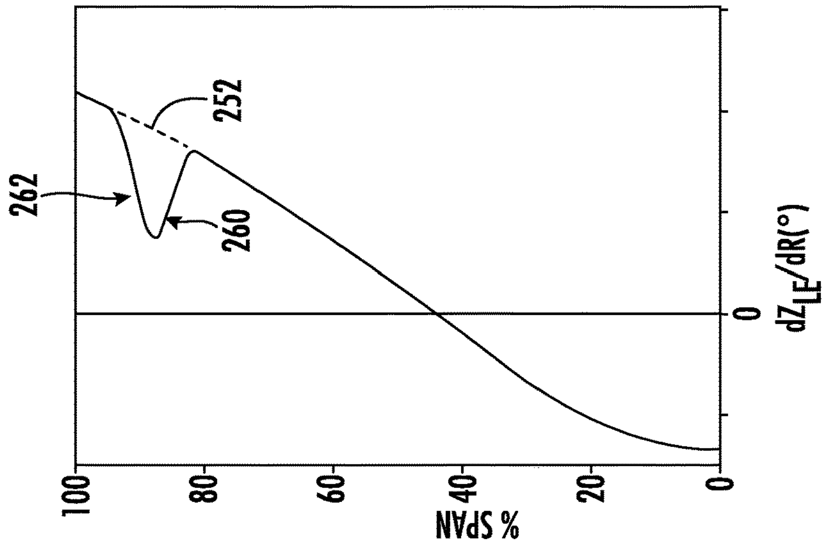
FIG. 4B is a graph plotting an axial sweep profile of the airfoil of FIG. 4A according to an embodiment of the present disclosure.
Figure 4C:
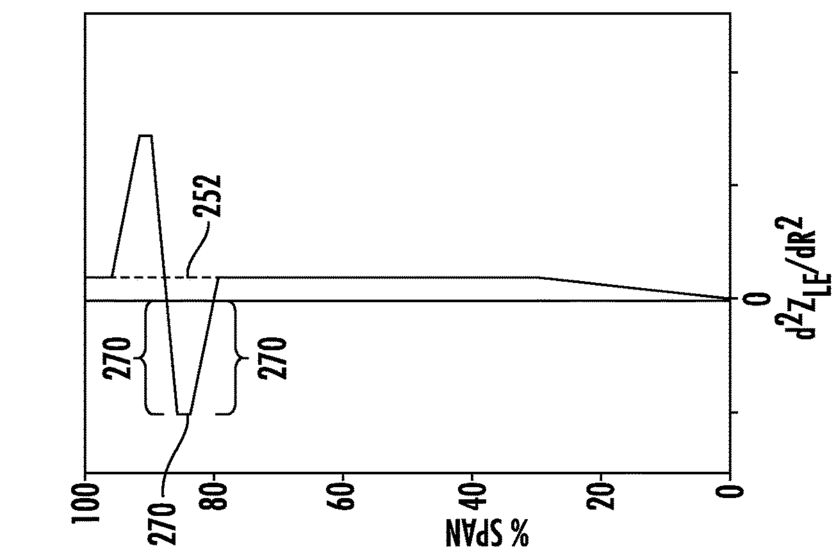
FIG. 4C is a graph plotting a derivative of the axial sweep profile depicted in FIG. 4B according to an embodiment of the present disclosure.

Referring specifically to FIG. 3A, an exemplary embodiment of an airfoil or blade 214 is depicted where a shape or profile of the blade 214 is defined by a vertical axis representing a percentage of the span of the blade 214 (e.g., extending radially from, for example, a proximal end 250 of the blade 214 to a distal end or tip 228 of the blade 214) and a horizontal or Z-axis representing the profile of the blade 214 relative to the central blade or pitch change axis 156 (FIG. 1) of the blade 214. For example, in FIG. 3A, Z=0 represents the central blade or pitch change axis 156 (FIG. 1) of the blade 214 where a forward location relative to the central blade or pitch change axis 156 (FIG. 1) is right-to-left in FIG. 3A and an aft location relative to the central blade or pitch change axis 156 (FIG. 1) is left-to-right in FIG. 3A.

In FIG. 3A, the blade 214 includes a leading edge 234 and a trailing edge 236. As depicted in FIG. 3A, the blade 214 also includes a feature 240 located on the leading edge 234. In FIG. 3A, a baseline profile of the leading edge 234 of the blade 214 without the feature 240 is defined by the baseline profile line 252. As illustrated in FIG. 3A, the feature 240 includes an inboard portion 260 and an outboard portion 262. In the embodiment illustrated in FIG. 3A, the feature 240 provides a single non-monotonic sweep of the leading edge 234 located between a medial location or midsection 264 of the blade 214 and the tip 228 of the blade 214. In the illustrated embodiment, the inboard portion 260 of the feature 240 begins at or outboard of 80% of the span of the blade 214, and the outboard portion 262 of the feature 240 extends from the inboard portion 260 to the tip 228 of the blade 214.

In the illustrated embodiment, the inboard portion 260 of the feature 240 effectively reduces the sweep of the leading edge 234 of the blade 214 along at least a portion of the span of the leading edge 234. FIG. 3B depicts a graph plotting an axial sweep profile of the leading edge 234 of the blade 214 of FIG. 3A in degrees. For example, in FIG. 3B, the vertical axis represents a percentage of the span of the leading edge 234 of the blade 214 (e.g., extending radially from, for example, the proximal end 250 of the blade 214 to the distal end or tip 228 of the blade 214) and the horizontal axis represents the change in a Z-position of the leading edge 234 of the blade 214 relative to the change in the span of the leading edge 234 of the blade 214. The axial sweep profile of the leading edge 234 may be represented by:

$$dZ_{LE}/dR$$

where $dZ_{LE}$ represents a change in Z-position of the leading edge 234, and dR represents a change in the span represented by the radial location R. As depicted in FIGS. 3A and 3B, the inboard portion 260 of the feature 240 results in a lower or reduced sweep (e.g., a negative change in Z relative to a change in the span or radial location R of the leading edge 234) while the outboard portion 262 results in a greater rate of change to Z relative to the radial coordinate R of the leading edge 234 of the blade 214. FIG. 3C depicts a graph plotting a derivative of the axial sweep profile depicted in FIG. 3B. The derivative of the axial sweep profile is represented as:

$$d^2Z_{LE}/dR^2$$

As illustrated in FIG. 3C, the feature 240 on the leading edge 234 of the blade 214 depicted in FIG. 3A results in a single region of negative sweep gradient 270 (e.g., a decreasing sweep profile). As shown in FIGS. 3A and 3B, the blade 214 has a high level of sweep at the leading edge 234 near the distal end or tip 228 of the blade 214. This high level of sweep enables the blade 214 to achieve high levels of aerodynamic performance with reduced levels of noise from pressure waves radiated from the blade 214 when the blade 214 is rotating. In the embodiment shown, the axial sweep profile of the blade 214 is maintained in the outboard portion 262 of the feature 240. However, the leading edge 234 of the blade 214 containing the feature 240 is closer to the pitch axis 156 (FIG. 1) at Z=0, thereby reducing the twisting moment of the blade 214 about the pitch axis 156 (FIG. 1) due to centrifugal and aerodynamic loads. Thus, the feature 240 allows for increased aerodynamic performance and lower noise while reducing twisting moments and induced mechanical stresses at the root of the blade 214.

FIGS. 4A-4C, 5A-5C, 6A-6C, 7A-7C, and 8A-8C depict axial sweep profile graph plots, and axial sweep profile derivative graph plots of various different embodiments of a blade 214 with a feature 240 on the leading edge 234 of the blade 214 according to embodiments of the present disclosure. In the illustrated embodiments, an inboard portion 260 of the feature 240 begins at varying span or radial locations R and has varying profiles in the Z-direction while maintaining a reduced sweep profile and a single region of negative sweep gradient. In each of the illustrated embodiments, the inboard portion 260 begins at a span or radial location R between a medial location or midsection 264 of the blade 214 and the tip 228 of the blade 214, and an outboard portion 262 of the feature 240 extends radially outward from the inboard portion 260 to the tip 228 of the blade 214.

Figure 5C:
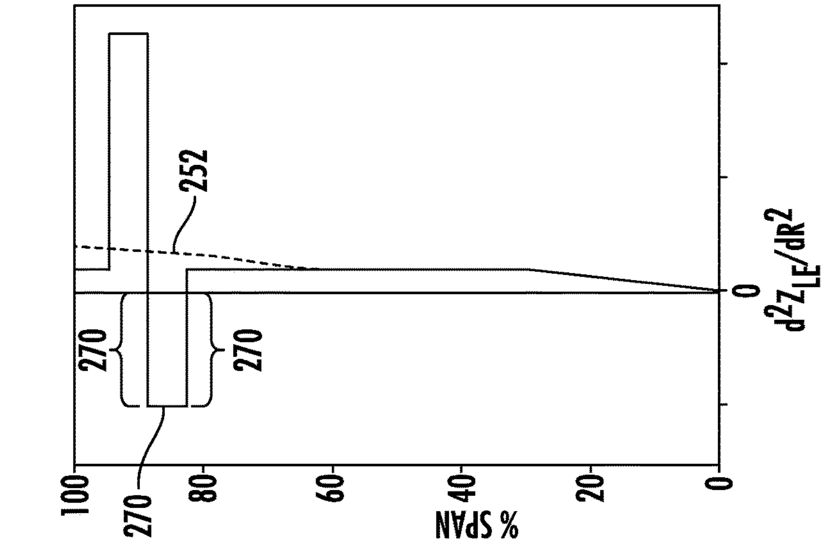
FIG. 5C is a graph plotting a derivative of the axial sweep profile depicted in FIG. 5B according to an embodiment of the present disclosure.
Figure 5B:
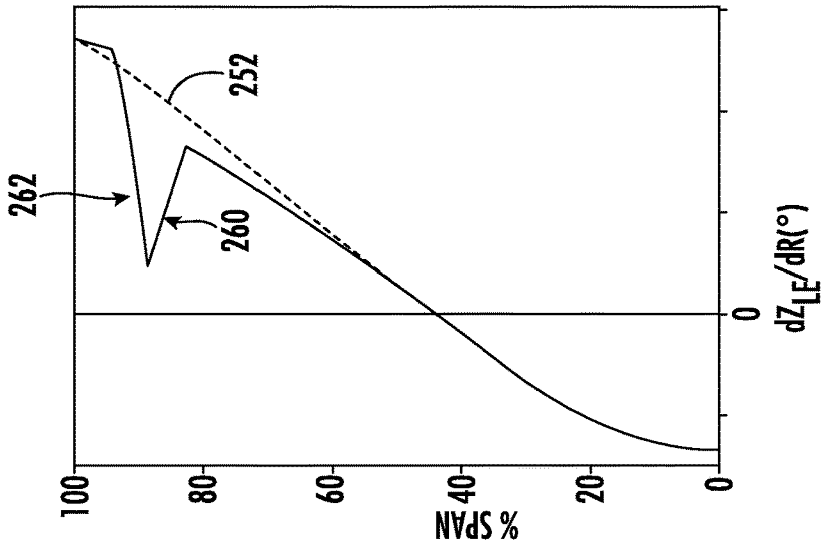
FIG. 5B is a graph plotting an axial sweep profile of the airfoil of FIG. 5A according to an embodiment of the present disclosure.
Figure 5A:
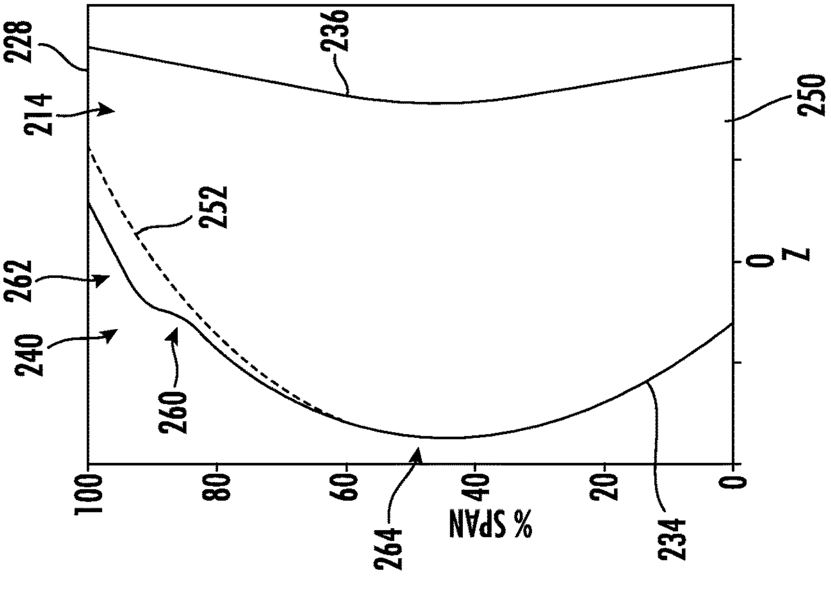
FIG. 5A is a schematic view of an exemplary airfoil according to another embodiment of the present disclosure.
Figure 6C:
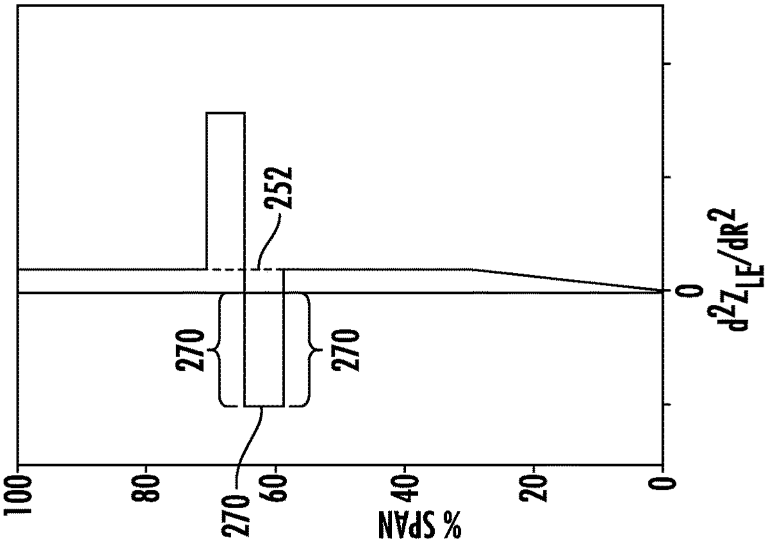
FIG. 6C is a graph plotting a derivative of the axial sweep profile depicted in FIG. 6B according to an embodiment of the present disclosure.
Figure 6B:
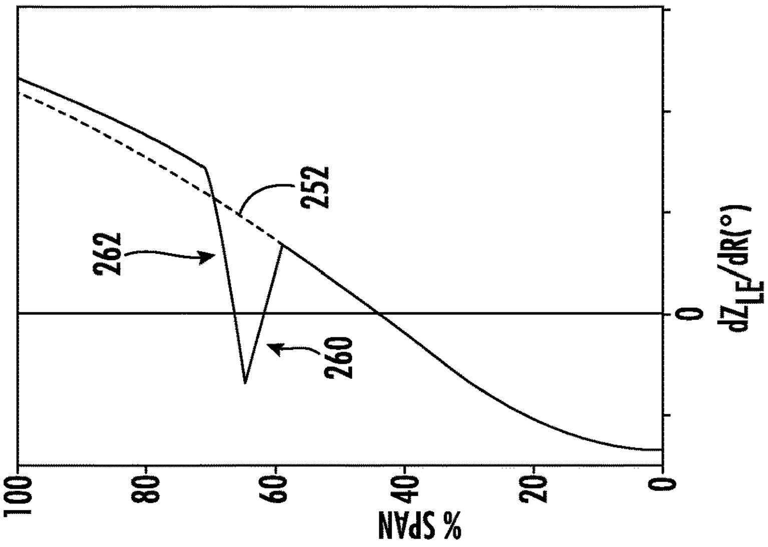
FIG. 6B is a graph plotting an axial sweep profile of the airfoil of FIG. 6A according to an embodiment of the present disclosure.
Figure 6A:
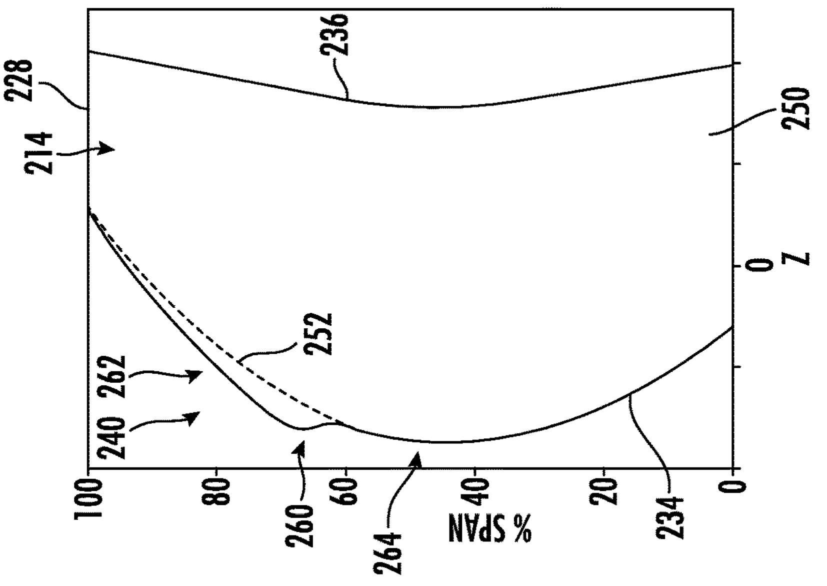
FIG. 6A is a schematic view of an exemplary airfoil according to another embodiment of the present disclosure.
Figure 7C:
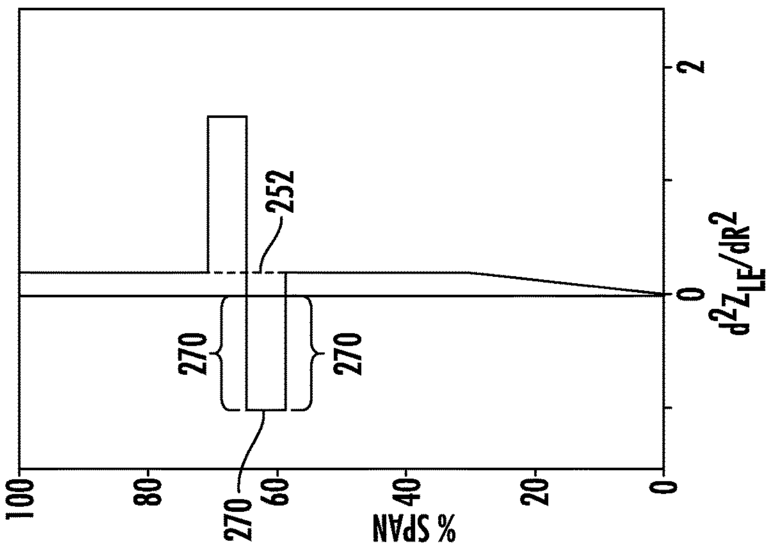
FIG. 7C is a graph plotting a derivative of the axial sweep profile depicted in FIG. 7B according to an embodiment of the present disclosure.
Figure 7B:
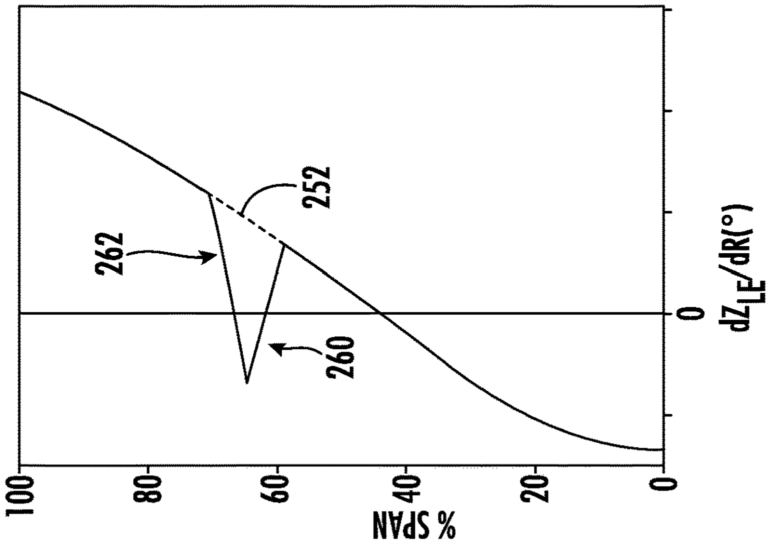
FIG. 7B is a graph plotting an axial sweep profile of the airfoil of FIG. 7A according to an embodiment of the present disclosure.
Figure 7A:
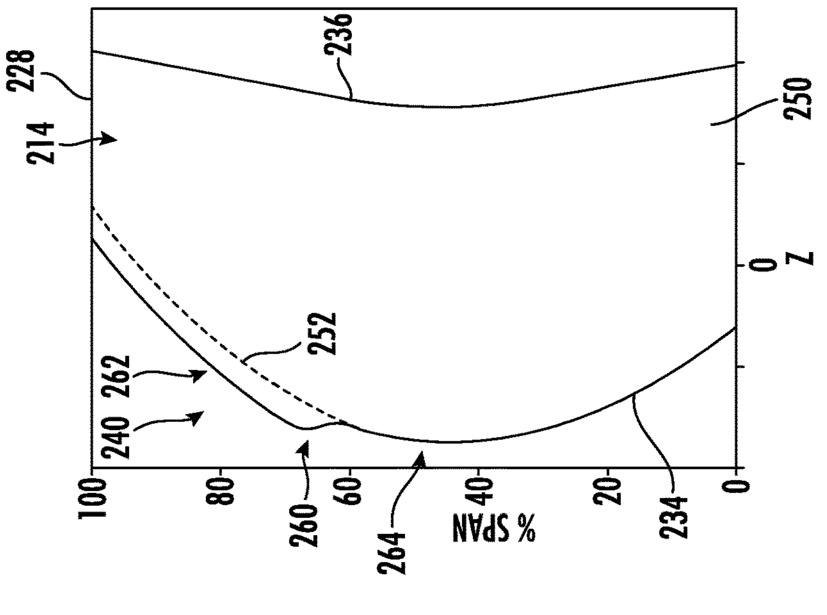
FIG. 7A is a schematic view of an exemplary airfoil according to another embodiment of the present disclosure.
Figure 8A:
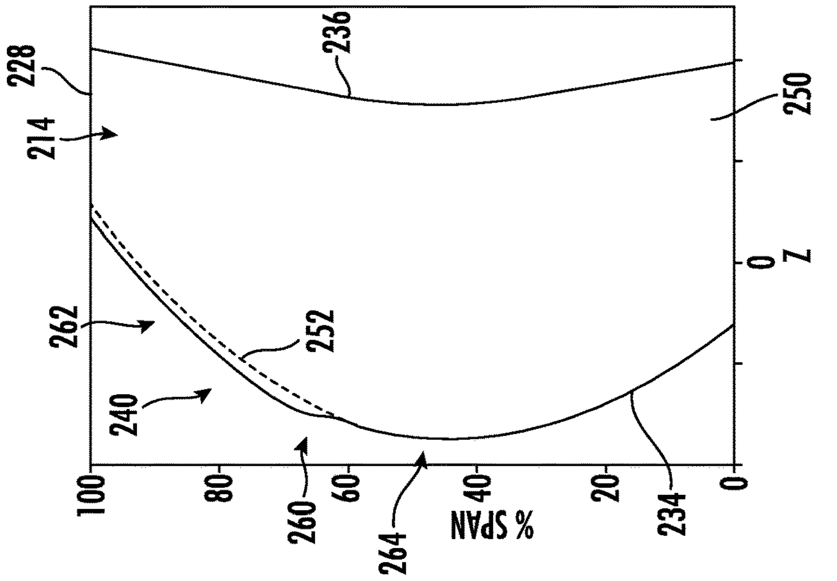
FIG. 8A is a schematic view of an exemplary airfoil according to another embodiment of the present disclosure.
Figure 8B:
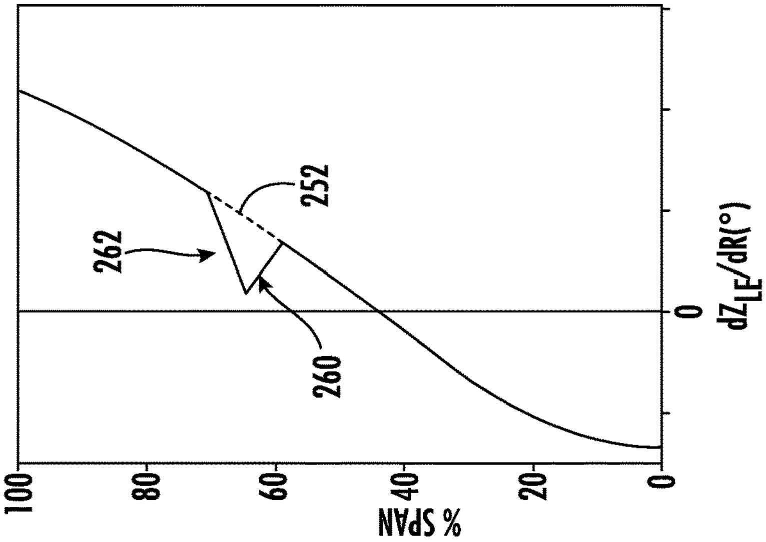
FIG. 8B is a graph plotting an axial sweep profile of the airfoil of FIG. 8A according to an embodiment of the present disclosure.
Figure 8C:
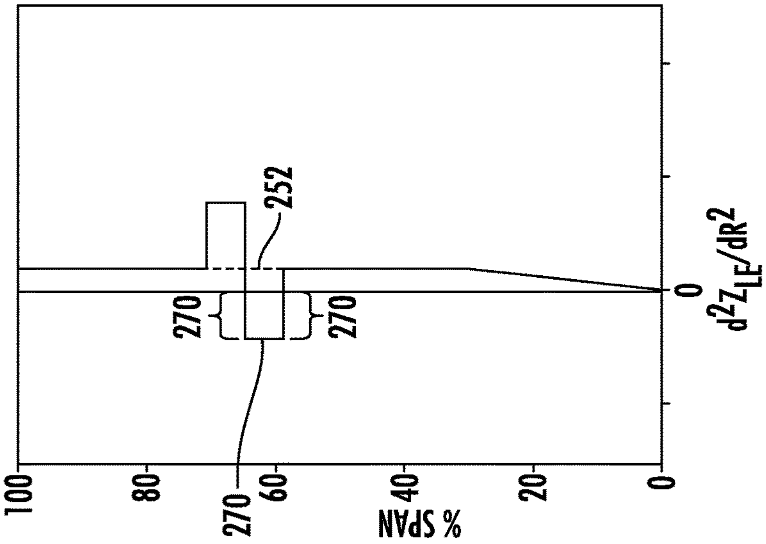
FIG. 8C is a graph plotting a derivative of the axial sweep profile depicted in FIG. 8B according to an embodiment of the present disclosure.

Additionally in the embodiments shown in FIGS. 5A-5C and 6A-6C, the outboard portion 262 of the feature 240 has an increased sweep near the tip 228 of the blade 214 relative to the baseline profile line 252 of a blade without feature 240. This increased sweep improves the aerodynamic performance and reduces the noise generated by the blade 214 relative to a blade without the feature 240. Further, the axial sweep profile can be defined by different types of curves including a piecewise line (FIG. 4B) or a smooth line (FIG. 5B). The feature 240 can be located near the tip 228 (FIGS. 3A, 4A, 5A) (e.g., located at or greater than eighty percent (80%) of the span of the blade 214), more inboard near the medial location 264 (FIGS. 6A, 7A and 8A), or at any radial or span location in between. Additionally, the change in axial sweep of the feature 240 can have varying amplitudes (e.g., the axial sweep of the feature 240 can be moderate (FIG. 8A), or the change in axial sweep of the feature 240 can be more pronounced (FIG. 7A)).

Figure 9B:
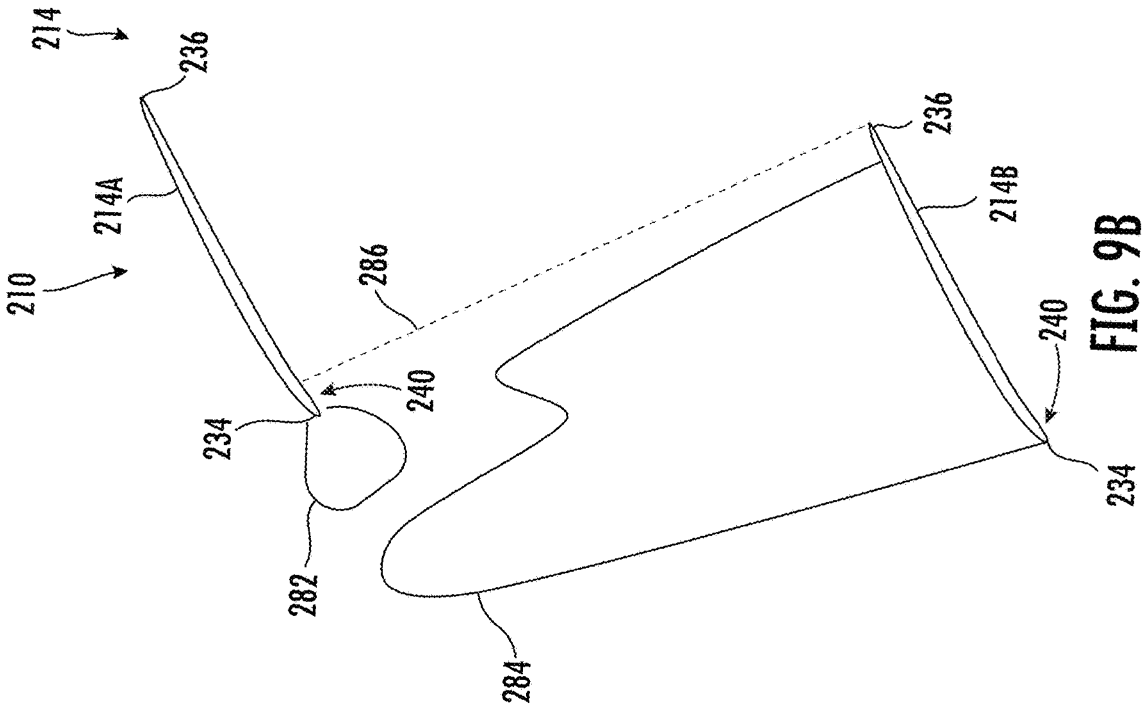
FIG. 9B is a schematic diagram depicting exemplary steady pressure fields associated with an exemplary airfoil according to embodiments of the present disclosure.
Figure 9A:
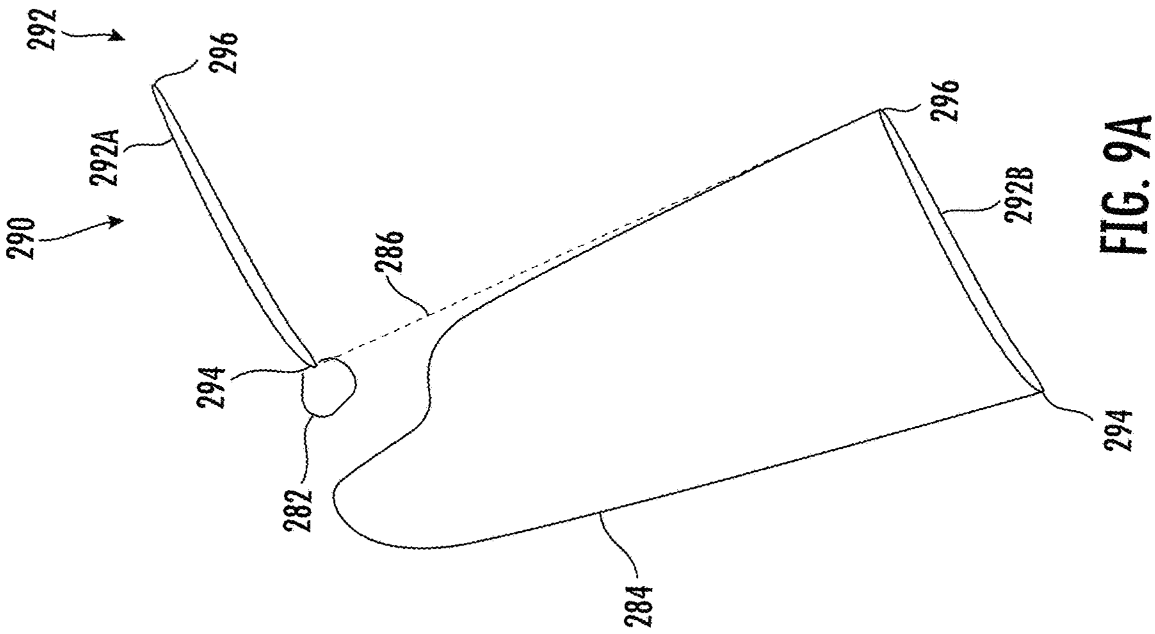
FIG. 9A is a schematic diagram depicting exemplary steady pressure fields associated with an exemplary baseline airfoil.

FIG. 9A is a schematic diagram depicting a steady pressure field in a blade-to-blade direction associated with an airfoil assembly 290 without a feature 240 (FIGS. 2, 3A, 4A, 5A, 6A, 7A, and 8A) of the present disclosure, and FIG. 9B is a schematic diagram depicting a steady pressure field in a blade-to-blade direction associated with an airfoil assembly 210 containing a feature 240 (FIGS. 2, 3A, 4A, 5A, 6A, 7A, and 8A) according to embodiments of the present disclosure. In FIG. 9A, two adjacent blades 292 (e.g., blades 292A and 292B) are depicted of the airfoil assembly 290 where each of blades 292A and 292B includes a leading edge 294 and a trailing edge 296. The blades 292A and 292B may be configured similar to the blades 214 except without the feature 240 (FIGS. 2, 3A, 4A, 5A, 6A, 7A, and 8A). In FIG. 9B, two adjacent blades 214 (e.g., blades 214A and 214B) are depicted of the airfoil assembly 210 where each of the blades 214A and 214B includes a leading edge 234 and a trailing edge 236, and where the blades 214A and 214B are configured with the feature 240 (FIGS. 2, 3A, 4A, 5A, 6A, 7A, and 8A).

This circumferential variation of the pressure field generates noise radiating away from a blade 214 as the blade 214 rotates. Referring to FIG. 9B, the feature 240 (FIGS. 2, 3A, 4A, 5A, 6A, 7A, and 8A) is radially or spanwise located on the leading edge 234 to at least partially block or disrupt a pressure field radiated by an adjacent blade 214. For example, in some embodiments, the airfoil assembly 210 is configured to reduce noise caused by pressure waves impacting the fuselage of an aircraft that are generated by the blades 214. In some embodiments, the noise reduction is achieved during a cruise phase of operation of the gas turbine engine 100 (FIG. 1). Thus, in this embodiment, the orientation of the blades 214 is considered to be at a cruise phase position (e.g., via actuators 158 (FIG. 1)). However, it should be understood that embodiments of the present disclosure are applicable to other operational phases of flight and corresponding blade 214 pitch positions.

The feature 240 is located radially or spanwise on the leading edge 234 of the blade 214 to enable the feature 240 to at least partially block or disrupt a pressure field radiated by an adjacent blade 214. In some embodiments, a radial or spanwise location the feature 240 is such that at least part of the feature 240 is located at or inboard of a chord 280 defined on the blade 214 where a projection of a line 286 normal (e.g., in a two-dimensional unwrapped view) to the chord 280 at its intersection with the trailing edge 236 intersects the leading edge 234 of the adjacent blade 214. In FIGS. 9A and 9B, a high pressure zone 282 and a low pressure zone 284 are depicted in connection with airfoil assemblies 290 and 210, respectively. As indicated by comparing the high pressure zone 282 and low pressure zone 284 between FIGS. 9A and 9B, the presence of the feature 240 on the blades 214 has a blocking effect on the pressure field generated by the adjacent blade 214, thereby resulting in a reduced noise generation by the blades 214. For example, as illustrated in FIGS. 9A and 9B, low pressure zones 284 are depicted on the suction side of respective blades 292 and 214, and high pressure zones 282 are depicted at the leading edges 294 and 234 of respective blades 292 and 214. As best illustrated in FIG. 9B, the feature 240 (FIG. 2) on blade 214A blocks the louder noise regions generated by the low pressure region 284 on the blade 214B.

Generally, an open or unducted fan architecture can generate high levels of tonal noise at certain frequencies resulting in high levels of tonal noise inside an aircraft cabin (e.g., resulting from the pressure waves impacting the fuselage of the aircraft). Embodiments of the present disclosure reduce the pressure signature generated by the blades by at least partially blocking or disrupting the pressure waves emanating from the blades. By introducing a shape variation on the leading edge of the blade (e.g., the feature 240 (FIGS. 2, 3A, 4A, 5A, 6A, 7A, and 8A)) that changes the axial sweep profile at a particular radial or span location, the shape variation reduces noise while reducing mechanical risk of the blade 214 (e.g., as opposed to increasing the sweep and dihedral of a blade that may introduce increased load at the blade root and/or pitch change mechanism due to increased mass of the blade away from the pitch change axis).

Figure 10:
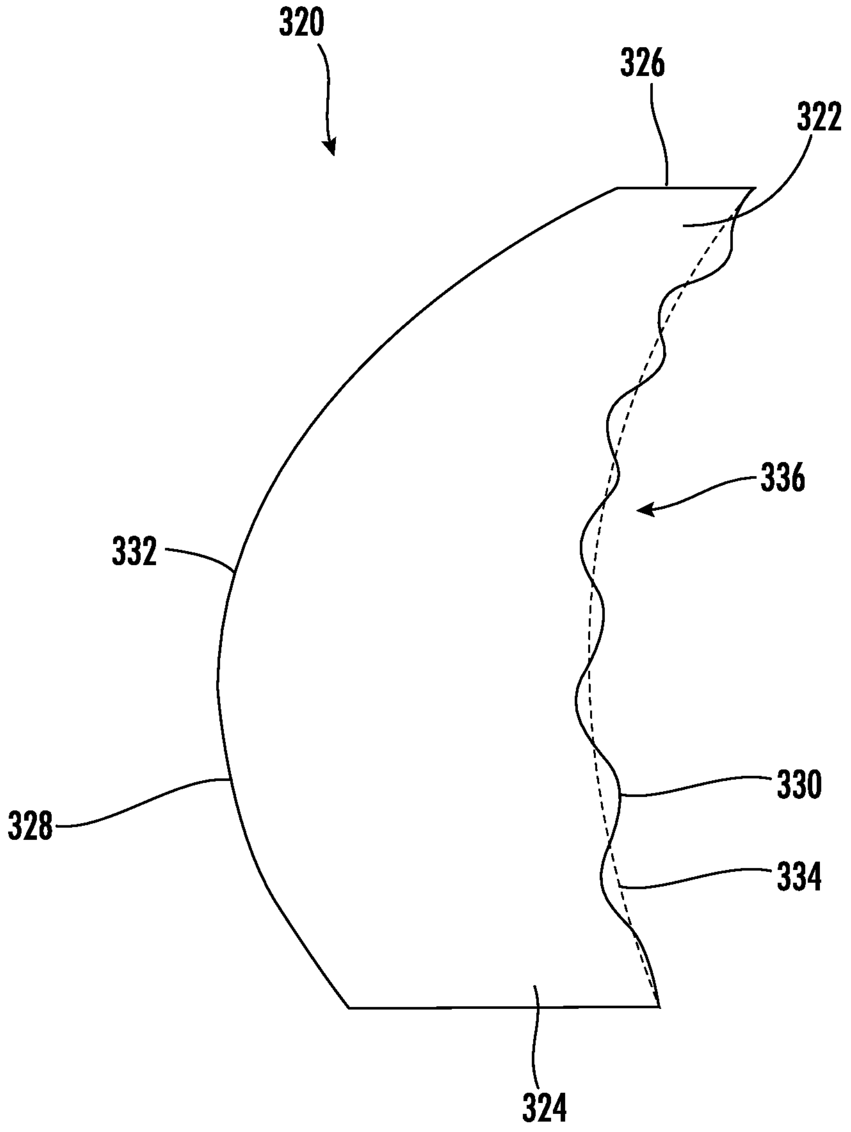
FIG. 10 is a schematic view of an exemplary airfoil according to another embodiment of the present disclosure.

Referring to FIG. 10, FIG. 10 is a schematic view of an exemplary airfoil or blade 322 of an airfoil assembly 320 according to another embodiment of the present disclosure. The blade 322 and airfoil assembly 320 may be configured similarly to the blade 214 and airfoil assembly 210 of FIGS. 2-8C except the blade 322 includes a sculpted trailing edge feature 336. For example, in the illustrated embodiment, blade 322 includes a proximal end 324 (i.e., an inboard end in the radial direction R toward the longitudinal axis 112 (FIG. 1)) and a distal end or tip 326 such that a span of the blade 322 is defined between the proximal end 324 and the tip 326. Blade 322 forms an aerodynamic surface extending along the axial direction A between a leading edge 328 and a trailing edge 330. In the illustrated embodiment, the blade 322 includes at its trailing edge 330 the sculpted trailing edge feature 336 (e.g., a wavy feature or plurality of features) configured to facilitate wake mixing to reduce interaction noise caused by the blade 322 wakes impinging on downstream stationary airfoils or stators, as described in U.S. Pat. No. 8,083,487 B2 which is hereby incorporated by reference in its entirety. A baseline 334 trailing edge having a smooth profile is depicted to further illustrate the sculpted trailing edge feature 336.

Thus, embodiments of the present disclosure include circumferentially spaced airfoils or blades where the blades include a leading edge shape variation feature to reduce the noise effects resulting from pressure waves generated by the blades. For example, embodiments of the present disclosure reduce the pressure signature generated by the rotating blades by blocking or disrupting the pressure waves emanating from the blades by changing the axial sweep profile of the leading edge of the blade. The shape variation feature includes a non-monotonic variation in sweep and has a portion providing a reduction in sweep on the leading edge at a defined radial location.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

While this disclosure has been described as having exemplary designs, the present disclosure can be further modified within the scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

Further aspects are provided by the subject matter of the following clauses:

An airfoil assembly for a gas turbine engine, the airfoil assembly comprising: a first blade having a first leading edge and a first trailing edge; and a second blade circumferentially spaced from the first blade, the second blade having a second leading edge and a second trailing edge; and wherein the first blade includes a feature formed on the first leading edge, wherein the first blade includes a chord extending from the first leading edge to the first trailing edge, the chord located radially where a projection of a line normal to an intersection of the chord with the first trailing edge intersects the second leading edge, and wherein at least a portion of the feature is radially located at or inboard of the chord.

The airfoil assembly of the preceding clause, wherein the feature includes an inboard portion and an outboard portion, and wherein at least part of the inboard portion is radially located at or inboard of the chord.

The airfoil assembly of any preceding clause, wherein the outboard portion extends to a radial location outboard of the chord.

The airfoil assembly of any preceding clause, wherein the feature comprises a non-monotonic variation in sweep.

The airfoil assembly of any preceding clause, wherein the first blade includes a proximal end and a tip, and wherein the feature includes an inboard portion and an outboard portion, and wherein the outboard portion extends to the tip.

The airfoil assembly of any preceding clause, wherein the first blade includes a proximal end, a midsection, and a tip, and wherein the feature is located between the midsection and the tip.

The airfoil assembly of any preceding clause, wherein the feature includes an inboard portion and an outboard portion, and wherein the inboard portion is a reduction in a sweep of the first leading edge.

The airfoil assembly of any preceding clause, wherein the feature is located in an acoustically active span of the first blade.

The airfoil assembly of any preceding clause, wherein the first trailing edge comprises a smooth, curved axial profile.

The airfoil assembly of any preceding clause, wherein the first trailing edge comprises a sculpted trailing edge feature.

The airfoil assembly of any preceding clause, wherein the first trailing edge incorporates a plurality of spaced-apart wave-shaped projections configured to facilitate wake mixing to reduce interaction noise caused by the blade wakes impinging on downstream stationary blades.

An airfoil assembly for a gas turbine engine, the airfoil assembly comprising: a plurality of circumferentially spaced blades, wherein each blade of the plurality of blades includes: a leading edge and a trailing edge; a pitch change axis; and a feature formed on the leading edge; and wherein the feature is formed at a radial location R and having a leading edge location Z relative to the pitch change axis, and wherein the feature is defined having a single portion where $d^2Z/dR^2<0$.

The airfoil assembly of any preceding clause, wherein each blade of the plurality of blades includes a proximal end, a midsection, and a tip, and wherein the feature is located between the midsection and the tip.

The airfoil assembly of any preceding clause, wherein the feature comprises a non-monotonic variation in sweep.

The airfoil assembly of any preceding clause, wherein each blade of the plurality of blades includes a proximal end and a tip, and wherein the feature includes an inboard portion and an outboard portion, and wherein the outboard portion extends to the tip.

The airfoil assembly of any preceding clause, wherein the plurality of blades includes a first blade and a second blade, and wherein the feature of the first blade disrupts a pressure field and noise radiated by the second blade.

The airfoil assembly of any preceding clause, wherein the feature includes a reduced axial sweep profile.

The airfoil assembly of any preceding clause, wherein the feature includes an inboard portion and an outboard portion, and wherein the inboard portion includes a reduced axial sweep profile.

The airfoil assembly of any preceding clause, wherein the feature includes an inboard portion located at or greater than eighty percent of a span of a respective blade.

A gas turbine engine, comprising: a turbomachine; and a fan assembly rotatable by the turbomachine, the fan assembly including an airfoil assembly comprising: a first blade having a first leading edge and a first trailing edge; and a second blade circumferentially spaced from the first blade, the second blade having a second leading edge and a second trailing edge; and wherein the first blade includes a feature formed on the first leading edge, wherein a chord is defined on the first blade extending from the first leading edge to the first trailing edge, the chord located radially where a projection of a line normal to an intersection of the chord with the first trailing edge intersects the second leading edge, and wherein at least a portion of the feature is radially located at or inboard of the chord.

The gas turbine engine of any preceding clause, wherein the fan assembly comprises an unducted fan.

The gas turbine engine of any preceding clause, wherein the first blade includes a pitch change axis, and wherein the feature is formed at a radial location R and having a leading edge location Z relative to the pitch change axis, and wherein the feature is defined having a single portion where $d^2Z/dR^2<0$.

The gas turbine engine of any preceding clause, wherein the feature comprises a non-monotonic variation in sweep.

The gas turbine engine of any preceding clause, wherein the feature includes an inboard portion and an outboard portion, and wherein the inboard portion is radially located at or inboard of the chord.

The gas turbine engine of any preceding clause, wherein the first blade includes a proximal end and a tip, and wherein the feature includes an inboard portion and an outboard portion, and wherein the outboard portion extends to the tip.

The gas turbine engine of any preceding clause, wherein the first blade includes a proximal end, a midsection, and a tip, and wherein the feature is located between the midsection and the tip.

The airfoil assembly of any preceding clause, wherein the trailing edge comprises a smooth, curved axial profile.

What is claimed is:

1. An airfoil assembly for a gas turbine engine, the airfoil assembly comprising:

a first blade having a first leading edge and a first trailing edge; and a second blade circumferentially spaced from the first blade, the second blade having a second leading edge and a second trailing edge; and wherein the first blade includes a feature formed on the first leading edge, and when the first and second blades are oriented in a cruise phase position, at least a portion of the feature is radially located at or inboard of a chord defined on the first blade where a projection of a line normal to an intersection of the chord with the first trailing edge of the first blade intersects the second leading edge of the second blade.

2. The airfoil assembly of claim 1, wherein the feature includes an inboard portion and an outboard portion, and wherein at least part of the inboard portion is radially located at or inboard of the chord.

3. The airfoil assembly of claim 2, wherein the outboard portion extends to a radial location outboard of the chord.

4. The airfoil assembly of claim 1, wherein the feature comprises a non- monotonic variation in sweep.

5. The airfoil assembly of claim 1, wherein the first blade includes a proximal end and a tip, and wherein the feature includes an inboard portion and an outboard portion, and wherein the outboard portion extends to the tip.

6. The airfoil assembly of claim 1, wherein the first blade includes a proximal end, a midsection, and a tip, and wherein the feature is located between the midsection and the tip.

7. The airfoil assembly of claim 1, wherein the feature includes an inboard portion and an outboard portion, and wherein the inboard portion is a reduction in a sweep of the first leading edge.

8. An airfoil assembly for a gas turbine engine, the airfoil assembly comprising:

a plurality of circumferentially spaced blades, wherein each blade of the plurality of blades includes:

a leading edge and a trailing edge;

a pitch change axis; and a feature formed on the leading edge; and wherein the feature is formed at a radial location R and having a leading edge location $Z_{LE}$ relative to the pitch change axis, and wherein the feature is defined having a single portion where $$d^2Z_{LE}/dR^2<0.$$

9. The airfoil assembly of claim 8, wherein each blade of the plurality of blades includes a proximal end, a midsection, and a tip, and wherein the feature is located between the midsection and the tip.

10. The airfoil assembly of claim 8, wherein the feature comprises a non- monotonic variation in sweep.

11. The airfoil assembly of claim 8, wherein each blade of the plurality of blades includes a proximal end and a tip, and wherein the feature includes an inboard portion and an outboard portion, and wherein the outboard portion extends to the tip.

12. The airfoil assembly of claim 8, wherein the plurality of blades includes a first blade and a second blade, and wherein the feature of the first blade disrupts a pressure field and noise radiated by the second blade.

13. The airfoil assembly of claim 8, wherein the feature includes a reduced axial sweep profile.

14. The airfoil assembly of claim 8, wherein the plurality of blades comprises a first blade and second blade, and when the first and second blades are oriented in a cruise phase position, a projection of a line normal to an intersection of the line with the trailing edge of a first blade intersects the leading edge of a second blade to define a chord at the radial location R.

15. The airfoil assembly of claim 8, wherein the trailing edge comprises a sculpted trailing edge feature.

16. The airfoil assembly of claim 8, wherein the feature includes an inboard portion and an outboard portion, and wherein the inboard portion includes a reduced axial sweep profile.

17. The airfoil assembly of claim 8, wherein the feature includes an inboard portion located at or greater than eighty percent of a span of a respective blade.

18. An airfoil assembly for a turbomachine, the airfoil assembly comprising:

a turbomachine; and a fan assembly rotatable by the turbomachine, the fan assembly including an airfoil assembly comprising:

a first blade having a first leading edge and a first trailing edge; and a second blade circumferentially spaced from the first blade, the second blade having a second leading edge and a second trailing edge; and wherein the first blade includes a feature formed on the first leading edge, and when the first and second blades are oriented in a cruise phase position, at least a portion of the feature is radially located at or inboard of a chord defined on the first blade where a projection of a line normal to an intersection of the chord with the first trailing edge of the first blade intersects the second leading edge of the second blade.

19. The airfoil assembly of claim 18, wherein the feature comprises a non-monotonic variation in sweep.

20. The airfoil assembly of claim 18, wherein the feature includes a reduced axial sweep profile.

* * * * *